United States Patent [19]

Ronayne et al.

[11] 4,454,707

[45] Jun. 19, 1984

[54] CROP RETAINER UNIT FOR A BALER

[75] Inventors: Ronald J. Ronayne; Leroy Kluver, both of Celina, Ohio

[73] Assignee: The Paul Revere Corporation, Greenwich, Conn.

[21] Appl. No.: 423,633

[22] Filed: Sep. 27, 1982

[51] Int. Cl.³ ............................................. A01D 39/00
[52] U.S. Cl. .......................................... 56/341; 100/88
[58] Field of Search ...................... 56/341; 100/88, 89, 100/5

[56] References Cited

U.S. PATENT DOCUMENTS

| 3,316,694 | 5/1967 | McColly et al. | 100/89 |
| 3,914,926 | 10/1975 | Braunberger et al. | 56/341 |
| 4,257,219 | 3/1981 | Burrough et al. | 56/341 |
| 4,306,494 | 12/1981 | Nishibe et al. | 100/88 |

FOREIGN PATENT DOCUMENTS 1576713 10/1980 United Kingdom .................. 56/341

Primary Examiner—Jay N. Eskovitz
Attorney, Agent, or Firm—Abraham Ogman; Robert J. McNair

[57] ABSTRACT

A crop retainer unit is presented which prevents crop material from blocking the entrance throat of a cylindrical bale forming machine. The crop retainer unit mounts in the entrance throat of a baler having a fixed size horizontally oriented baling chamber. The gate comprises a shaft which spans the length of the chamber at a location near the top of the entrance throat. A plurality of rod-like elements project outwardly at spaced intervals from the shaft. All elements are in line. All extend radially outward from the shaft in a single direction. The shaft is mounted for rotation in the sidewalls of the machine. However, motion is restricted so the free ends of the elements are able to readily swing inward into the baling chamber but their outward motion is stopped at the point where the elements are tangentially in line with the circumferential periphery of the baling chamber.

5 Claims, 7 Drawing Figures

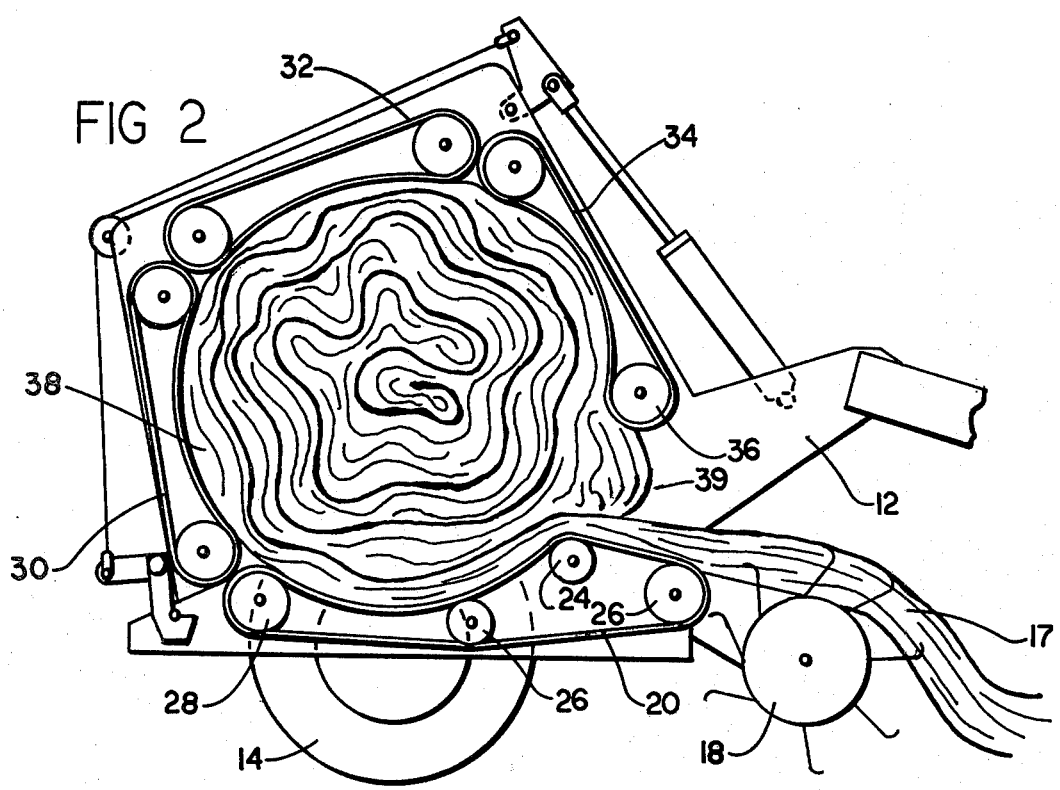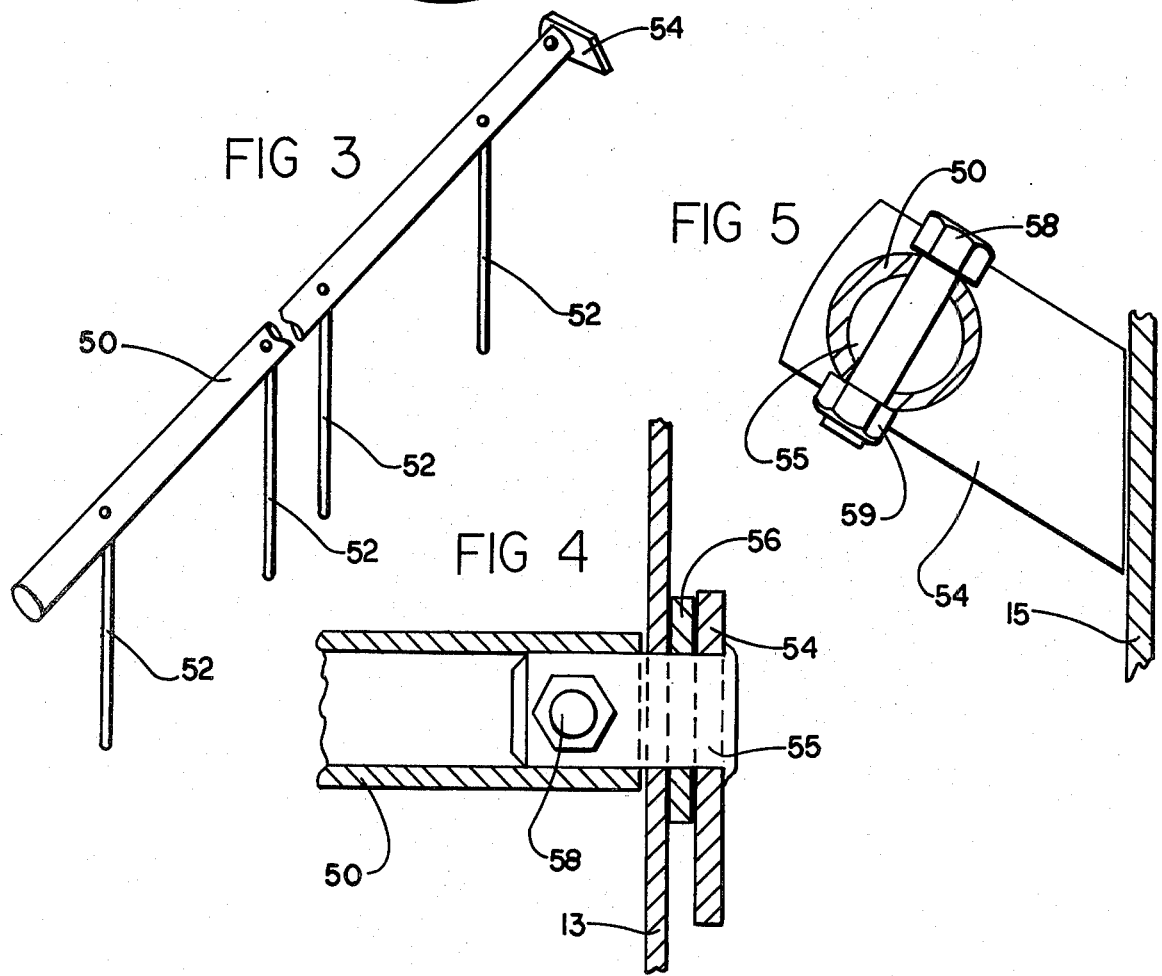

CROP RETAINER UNIT FOR A BALER

BACKGROUND OF THE INVENTION

This invention relates generally to round bale forming apparatus and, more particularly, to a crop retainer unit which is in the throat entrance to the baling chamber.

In the prior art, the U.S. Pat. No. 4,319,446 to Arnold, et al and assigned to the same assignee as this application, discloses bale forming apparatus which is generally similar to that used by applicants. The Arnold et al machine comprises a rigid frame supported on wheels to allow the unit to be drawn behind a tractor which also powers the baling system via its power take-off shaft. Upwardly extending sidewalls form the confining endwalls of the baling chamber. A plurality of serially arranged conveyors enclose and generally define the circumferential periphery of the baling chamber. Thus, the size of the baling chamber remains constant during the bale forming process. A pickup reel across the lower front of the machine gathers crop material from a windrow and delivers it through an entrance throat into the baling chamber. When the chamber is completely filled, the rear portion of the housing swings upward to enable rearward discharge of the cylindrical bale.

The U.S. patent application having Ser. No. 282,548 and assigned to the same assignee as this application, illustrates another round bale forming apparatus which is generally similar to applicants. The U.S. patent application Ser. No. 282,548 of Kluver et al describes a baler which is intended for forming cylindrical bales that are smaller in diameter than those formed by the baler of U.S. Pat. No. 4,319,446.

Both of the above balers utilize bottom conveyors comprised of four transversely extending rollers on which a plurality of laterally spaced endless belts are trained. Both balers are configured so that crop material picked up from the windrow is passed in almost a straight line from the top of the pickup reel to the nip between the bottom conveyor and the surface of the slowly turning bale within the baling chamber.

The crop retainer unit of this invention is placed in the entrance throat of such a fixed chamber baler. It was discovered that addition of the crop retainer unit overcame problems associated with the baling of certain types of forage during very dry weather conditions.

SUMMARY OF THE INVENTION

A crop retainer unit is presented which serves to hold crop materials within the main chamber of a baler. Use of the crop retainer unit prevents crop material in the baling chamber from blocking the entrance throat. In one implementation, the invention comprised a transversely mounted tubular shaft located at the top of the entrance throat to the baling chamber. The shaft spans the length of the chamber and is rotatably mounted in the sidewalls of the baler. A plurality of appropriately spaced elements are mounted at intervals along the shaft. All elements are in line. All extend radially outward from the shaft in a single direction. The elements can be straps, rods or other cross sectional shapes produced from any of various durable materials.

The shaft on which the elements are mounted is rotationally restrained so that the free ends of the elements can swing inward into the baling chamber but can swing outward only until they are in line with the circumferential periphery of the chamber. The length of each element is such that it generally spans the cross sectional height of the entrance throat to the chamber.

Operationally, the plurality of elements swing inward as crop material begins to move along the bottom conveyor after pickup from the windrow. As the bale begins to form in the chamber, the mass of crop material starts the compaction process with its associated rotational motion from the top forward along a downward curving trajectory past the inward directed pivoting elements of the crop retainer unit. Experiments show that a plurality of elements spaced about ten inches apart function to keep the compressed crop material from bulging outward into the entrance throat.

Use of the crop retainer unit reduces peak power requirements on the baling system. Without the unit, the crop fibers bulge outward into the open throat region as the bale nears completion. This comes about because there is no compressive force being exerted on that portion of the bale rotating past the open throat. Consequently, the crop fibers spread outward and in some instances create knotty bulges which interfere with the incoming stream passed on by the pickup reel. An energy absorbing slug may result.

With the crop retainer unit in place this does not occur. The pivoting elements maintain the rotating bale at near normal radius as it passes the open throat area. At the same time the pivoting elements can swing inward sufficiently so that they do not impede the flow of newly gathered material into the baling chamber.

BRIEF DESCRIPTION OF THE DRAWINGS

FIG. 2 shows a cutaway right side view of a baler not having the crop retainer unit.

FIG. 3 shows a perspective view of one configuration of the crop retainer unit.

FIG. 4 shows a partially cutaway view of the left end of the crop retainer unit illustrative of the manner in which the shaft is supported in the sidewall of the baler.

FIG. 5 shows the way in which a stop is used to restrain rotational motion of the crop retainer unit.

DESCRIPTION OF THE PREFERRED EMBODIMENT

Figure 1:
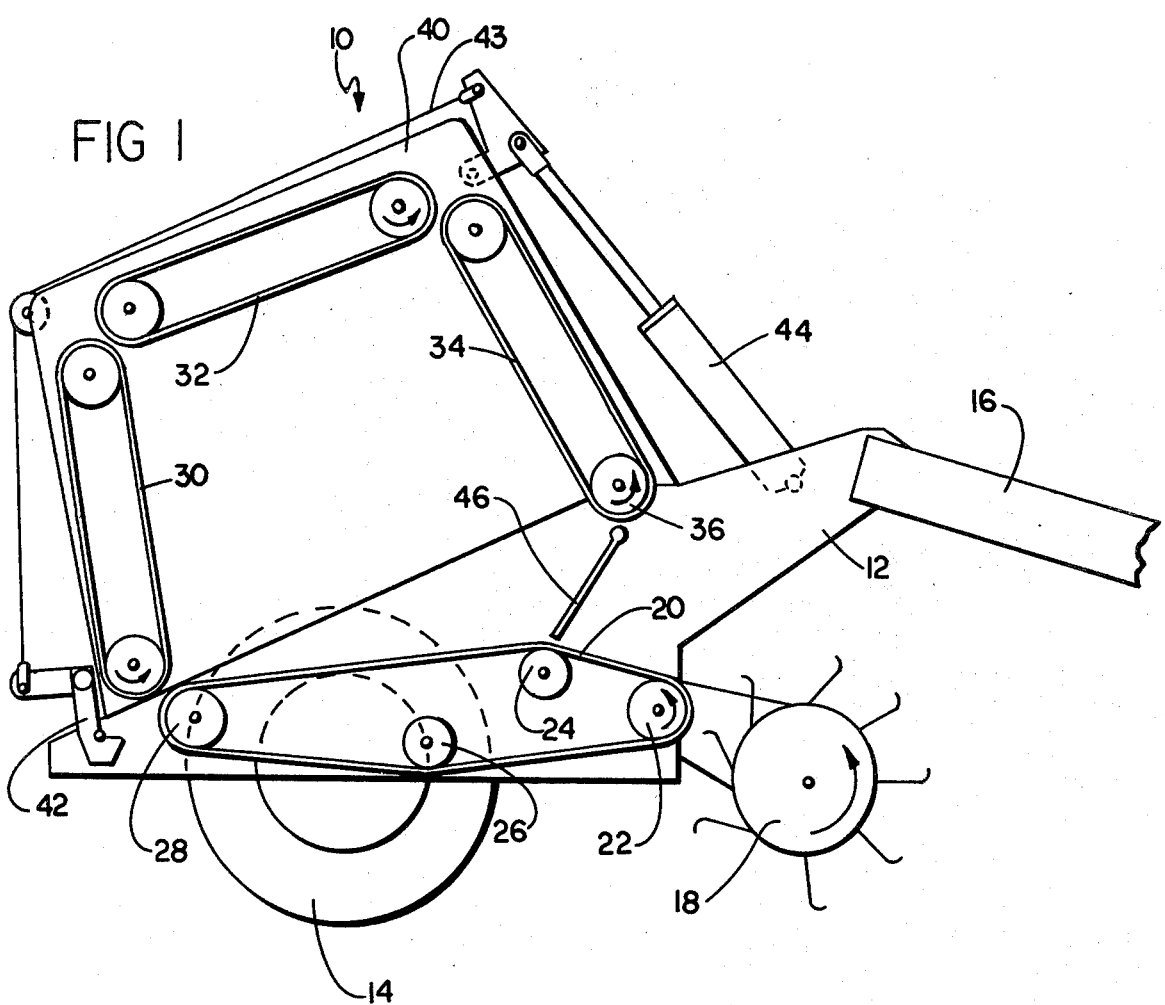
FIG. 1 is a cutaway right side view of a baler having the crop retainer unit incorporated therein.

FIG. 1 shows a cutaway side view of a baler 10 which is capable of gathering crop material from a windrow and forming it into bales of a generally cylindrical shape. Baler 10 is comprised of a frame 12 which is supported by a pair of wheels 14. The baler is intended to be drawn behind a tractor by means of a hitch which is on the forward end of tongue 16. When drawn behind a tractor so that the baler sits astride a windrow of crop material, the baler gathers up the crop by means of a pickup reel 18. Pickup reel 18 delivers the crop material to a conveyor which forms the bottom of the baling zone.

The conveyor comprises a plurality of side by side belts 20 which are carried over transversely extending rollers 22, 24, 26 and 28. In the unit reduced to practice the baling chamber was 5 ft. long and five of the belts 20 were used. Rollers 24, 26 and 28 are generally on the periphery of a fixed size baling zone. Roller 22 is mounted lower than roller 24. This is done so that a line passing from the top of pickup reel 18 to the top of roller 24 passes tangentially over roller 22. This helps to maintain a smooth flow of crop material into the baling zone.

Above the bottom conveyor is a series of three additional conveyor assemblies which generally surround the cylindrical baling zone. Each of the serially arranged conveyor assemblies 30, 32 and 34 consist of an upstream and a downstream roller over which is entrained a multiplicity of side by side endless belts. All rollers are journalled for rotation in the sidewalls of the machine. The central shaft of each downstream roller extends through the right sidewall of the machine. Sprockets on the extended shafts allow all conveyor assemblies to be driven counterclockwise as viewed in FIG. 1. The upper three assemblies are mounted in a subframe which pivots around the shaft of downstream roller 36. The rear edge of subframe 40 latches in position to the main frame by means of latching mechanism 42. Subframe 40 is caused to pivot around the shaft roller 36 by the action of hydraulic piston 44. When piston 44 retracts, latching mechanism 42 is released by action on cable 43. Further retraction of piston 44 causes the tailgate end of subframe 40 to rise sufficiently to allow a completed bale within the chamber to be discharged over the rear of the baler.

Our invention pertains to a crop retainer unit 46 which is positioned in the entrance throat area of the baler. The crop retainer unit is pivotally mounted below roller 36 as shown in FIG. 1. Without the crop retainer unit, the condition portrayed in FIG. 2 may come to pass. As shown in FIG. 2, a windrow of hay, straw, or other crop residue 17 is gathered up by the pickup reel 18 and delivered into the baling zone.

The prior are baler of FIG. 2 is similar to the FIG. 1 baler with crop retainer unit 46 removed. The FIG. 2 baler has frame 12 supported on a pair of wheels 14. Crop material in windrow 17 is carried into the baling zone by means of a plurality of side by side bottom conveyor belts 20. Belts 20 are carried over transversely extending rollers 22, 24, 26 and 28. As the weight of the bale increases each of the belts 20 is stretched so as to conform to the configuration shown. Belts 30, 32 and 34 also stretch as the crop material presses outward. As the mass of crop material fills the cavity a forced expanding bulge 39 begins to appear between rollers 36 and 24. Field tests have shown that the bulge is more prominent when baling relatively slippery crop material such as wheat straw and dry corn fodder. The result is that bulge 39 starts interferring with the smooth flow of material being delivered by pickup reel 18. There is a tendency to create a complete blockage of the entrance throat. This results from either of two conditions. One is that the crop material begins to flow forward out of the throat as fast as it is being delivered inward from the windrow. The second is that a large slug of material builds up, then surges inward toward the baling zone creating a power absorbing strain on both baler and tractor. Neither of these is desirable.

The problem can be avoided by the introduction of crop retainer unit 46. FIG. 3 shows the configuration of the unit which was reduced to practice. The unit consists of a transversely extending shaft 50 which is rotatably mounted at its ends in the sidewalls of the baler. A multiplicity of rods 52 are mounted at regularly spaced intervals along shaft 50. In the unit reduced to practice shaft 50 was a 1.3 inch diameter pipe which spanned the 5 ft. width of the baler. Each of the rods 52 was approximately 9 inches long. Each of the rods 52 had a cross sectional diameter of ⅜ inch. A stop 54 secured at one end of shaft 50 maintains the crop retainer unit at the proper angle within the throat of the baler.

FIGS. 4 and 5 show the manner in which the stop 54 operates. The left side of the crop retainer unit is shown in FIG. 4. The stop 54 is secured to a stub shaft 55 (for example by welding). The second end of stub shaft 55 is inserted in the left end of shaft 50 and secured thereto by means of bolt 58. The spacing between stop 54 and the end of shaft 50 is such that there is room for penetration through a hole in end support 13 of the baler frame 12. Additionally, there is a spacing washer 56 which provides both lubrication and support of stop 50 allowing the unit to rotate freely in frame member 13.

FIG. 5 shows a cross sectional view of shaft 50 with the cut made at bolt 58 which secures stub shaft 55 to shaft 50. The outer end of stop 54 rests against vertical support member 15. Vertical support member 15 may be part of an angle iron and frame member which comprises both the member 13 support shown in FIG. 4 and support member 15 shown in FIG. 5. Stop 54 thus allows the shaft of crop retainer unit 46 to rotate freely in the clockwise direction but limits its counterclockwise rotation.

Figure 1A:
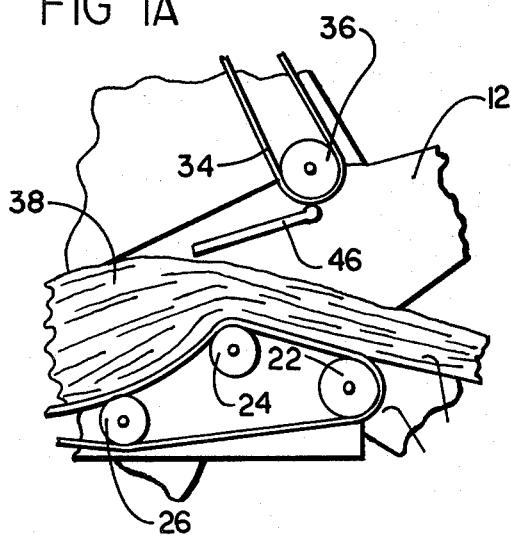
FIG. 1A is a partial view of the FIG. 1 baler showing how the elements of the crop retainer unit respond to the delivery of crop material after windrow pickup begins.
Figure 1B:
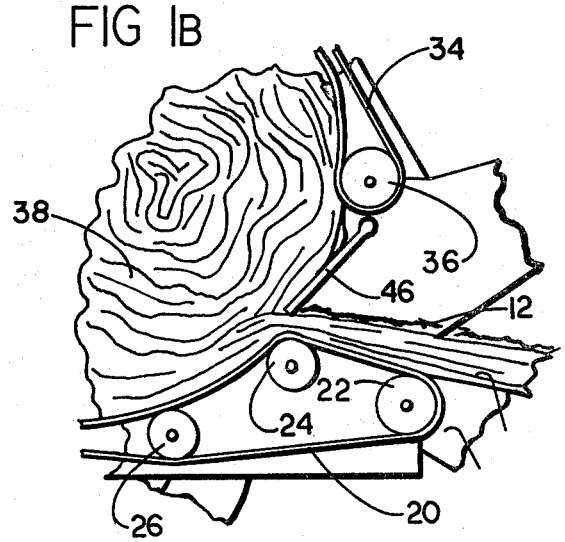
FIG. 1B is a partial view of the FIG. 1 baler showing operation of the crop retainer unit after the baling chamber is filled.

The limited counterclockwise motion is depicted in FIG. 1B. FIG. 1B depicts a partial view of the baler wherein crop material almost completely fills the baling chamber. With crop retainer unit 46 stopped at the angle shown, crop material 38 must follow the approximate circular contour of the bale. There is no possibility for a bulge to appear in the periphery of the bale such as is depicted in FIG. 2.

FIG. 1A shows the situation which occurs when the baling chamber is less than a quarter full. At the start of the formation of a bale, crop material is picked up from a windrow and delivery into the baling chamber initiated. Since there is no pressure from the crop material being delivered downward from belts 34, the crop retainer unit 46 rotates clockwise allowing easy delivery into the baling chamber.

While the invention has been described in conjunction with a baler which forms large cylindrical bales, it will be understood that it can be of utility in other gating applications. Various changes in the details, materials, steps and arrangement of parts may be made and will occur to those skilled in the art upon a reading of the above disclosure. Therefore, the invention should not be limited to the specific illustration disclosed, but only by the following claims.

We claim:

1. In combination with a tractor drawn round bale forming machine of the type wherein there is a bale forming chamber of fixed size having a horizontal axis and including a wheel mounted main frame, a pick-up reel across the lower front, a bottom conveyor incorporating side-by-side belts entrained on transversely extending rollers rotatably mounted in the main frame, there being means for driving both the bottom conveyor and the pick-up reel, the upper part of the machine including a subframe on which is mounted a plurality of serially arranged conveyors which enclose and generally define the circumferential periphery of the baling chamber, there being a space between the last of the serially arranged conveyor elements and the uppermost surface of the bottom conveyor forming thereby an inlet throat to the baling chamber; the improvement comprising:

a crop retainer unit mounted in said entrance throat, said gate including a shaft spanning the length of said chamber at a location directly below and adjacent to the downstream end of the last of said serially arranged conveyors, said shaft having secured thereto at spaced intervals one end of each of a plurality of rod-like elements, all elements being positioned in line and extending radially outward from said shaft in the same direction, said shaft being mounted for rotation in the sidewalls of said machine, rotational motion of said shaft being restricted so that the second ends of said elements can readily swing inward into the baling chamber but motion in the outward direction is stopped at the angle wherein the elements are tangentially in line with the circumferential periphery of the baling chamber.

2. The invention as defined in claim 1 wherein the length of each element is such as to effectively span the cross sectional height of the entrance throat.

3. The invention as defined in claim 1 wherein the elements placed at spaced intervals on said shaft include straps, rods and other cross sectional shapes produced from any of various durable materials.

4. The invention as defined in claim 1 wherein each of the rod-like elements has a length of approximately nine inches.

5. The invention as defined in claim 1 wherein the spacing between rod-like elements along said shaft is approximately ten inches.

* * * * *